Dec. 27, 1966   T. A. MIDDLESWORTH ETAL   3,294,418
ARTICULATED MODULAR VEHICLE
Original Filed March 8, 1962   3 Sheets-Sheet 1
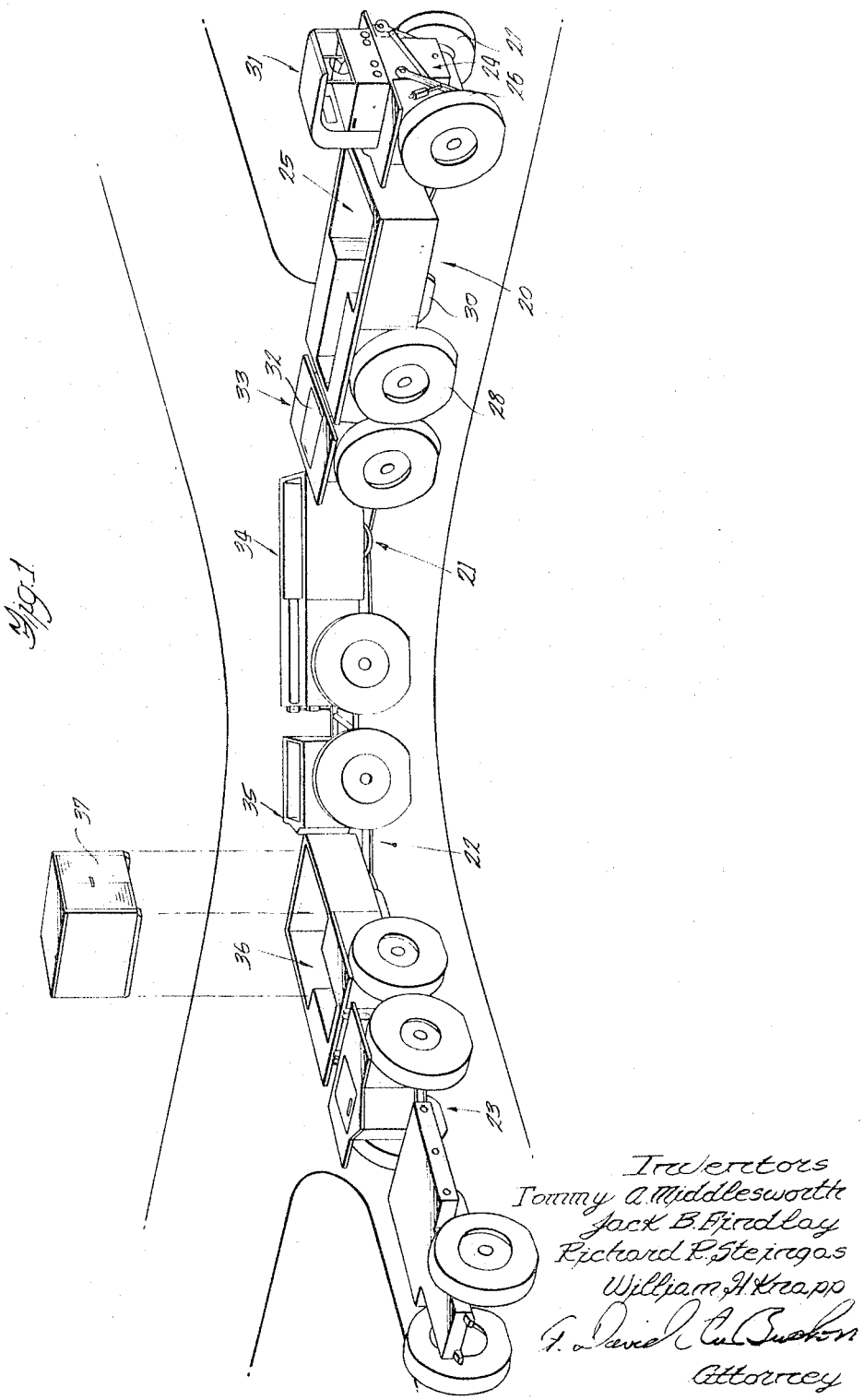

Dec. 27, 1966  T. A. MIDDLESWORTH ET AL  3,294,418
ARTICULATED MODULAR VEHICLE
Original Filed March 8, 1962  3 Sheets-Sheet 2
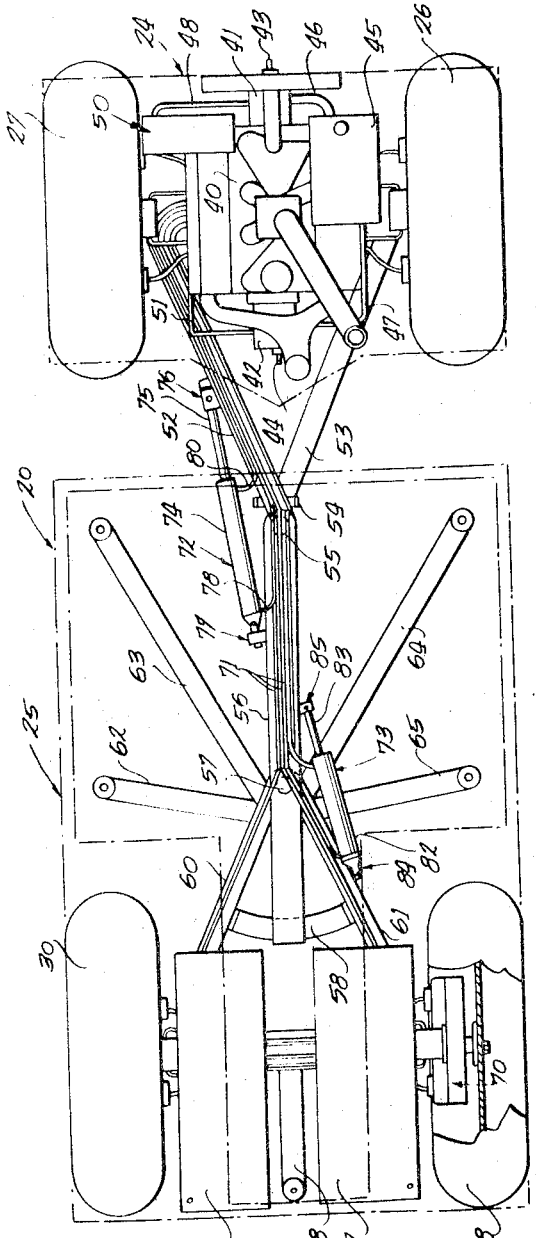
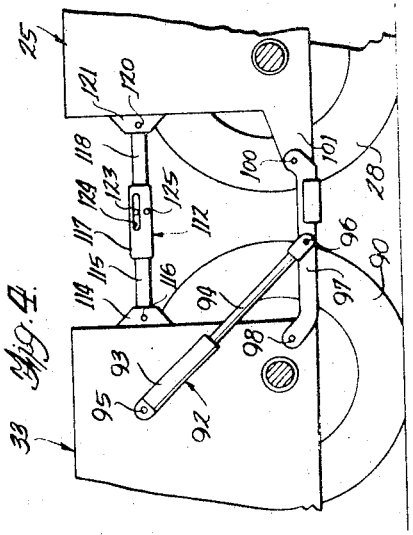
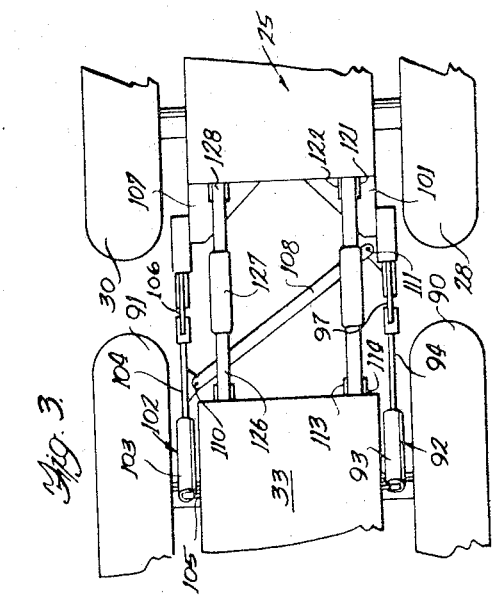
Inventors
Tommy A. Middlesworth
Jack B. Findlay
Richard R. Steingas
William H. Knapp
BY
F. David AuBuchon  ATTORNEY Dec. 27, 1966  T. A. MIDDLESWORTH ETAL  3,294,418
ARTICULATED MODULAR VEHICLE
Original Filed March 8, 1962  3 Sheets-Sheet 3
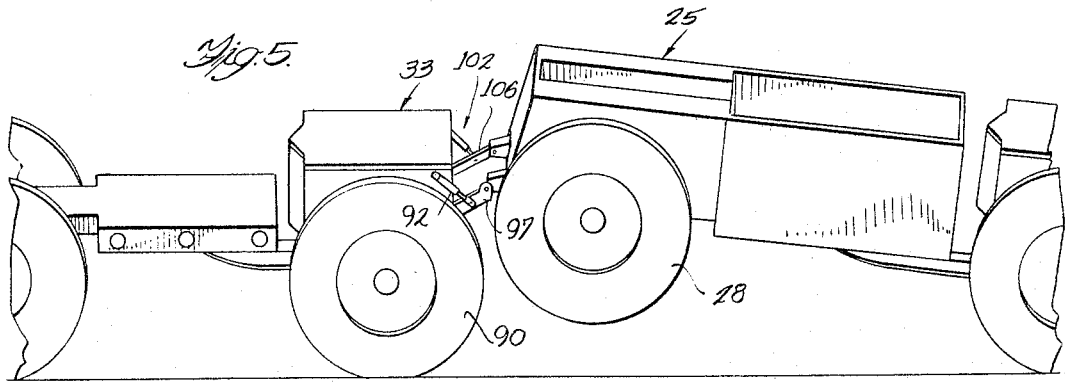
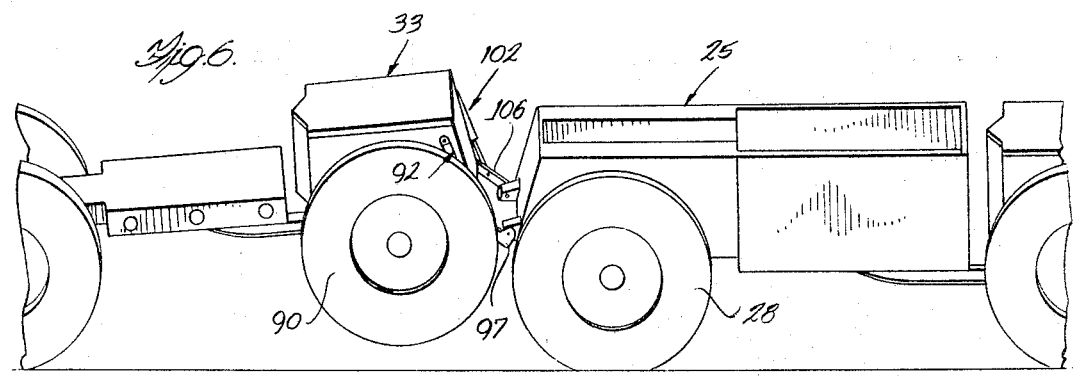
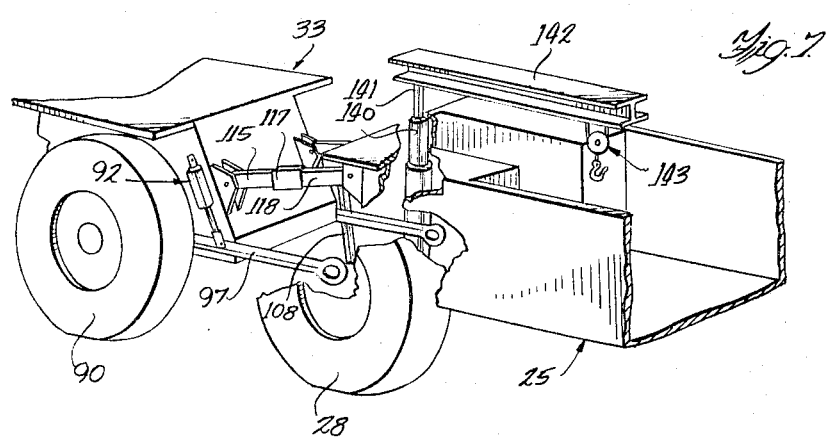
Inventors
Tommy A. Middlesworth
Jack B. Findlay
Richard R. Steinegas
William H. Krapp
Paul O. Pippel
Attorney

United States Patent Office 3,294,418
Patented Dec. 27, 1966

3,294,418
ARTICULATED MODULAR VEHICLE
Tommy A. Middlesworth, Hinsdale, Jack B. Findlay, Downers Grove, and Richard R. Steingas and William H. Knapp, Naperville, Ill., assignors to International Harvester Company, Chicago, Ill., a corporation of Delaware
Original application Mar. 8, 1962, Ser. No. 178,294, now Patent No. 3,246,714, dated Apr. 19, 1966. Divided and this application Sept. 14, 1965, Ser. No. 510,110
4 Claims. (Cl. 280—408)

This invention is directed to the field of articulated modular vehicles which can be intercoupled to form a train of vehicles, and more particularly to vehicles suitable for withstanding a multiplicity of conditions in traversing difficult terrains such as encountered in military operations. This application is a division of applicants' copending application, Serial No. 178,294, filed March 8, 1962, that has now matured into Patent No. 3,246,714 of April 19, 1966.

In the general class of vehicles suitable for assault and subsequent logistic support operations, the requirements imposed by the military are stringent indeed. It is requisite that such vehicles must be able to traverse any terrain such as mud, ash, sand, etc. and even withstand shocks such as imposed by a drop with a parachute.

It is therefore a primary object of the present invention to provide an articulated vehicle which is operable independently to satisfy all of the criteria defined above.

Another important object of the invention is the provision of such a vehicle which is modular, that is, readily intercoupled with other like vehicles to form a train of vehicles.

A corollary object of the invention is the provision of such a vehicle which, when coupled in a train of vehicles, positively and accurately follows the lead vehicle around corners.

An important object of the invention is the provision of a novel hitch for use between vehicles, which hitch can be locked in a preassigned position to afford support between the two vehicles, so that large holes or craters can be bridged by the vehicles.

A related object of the invention is the provision of such an intercoupling arrangement which is selectively operable to different positions, thereby to satisfy service requirements of jacking one or other of two intercoupled vehicles off the ground by utilizing the intercoupling arrangement.

It is apparent that such shunting can be utilized to provide four-wheel drive, two-wheel drive, or provide a vehicle which does not receive any motive power but acts completely as a trailer.

An important aspect of the invention is the manner in which the articulated vehicles, each comprising a front unit and a rear unit, are intercoupled. The intercoupling is such that the rear unit of the lead vehicle is aligned positively with the front unit of the next trailing vehicle, thereby to provide in effect a bogie including the two rear wheels of the lead unit and the two front wheels of the trailing unit. For purposes of this explanation and the appended claims, "bogie" refers to a support arrangement having a plurality of wheels and which acts independently, whether such arrangement is a two-wheel unit or a four-wheel unit comprised of pairs of wheels from two adjacent vehicles. With such an intercoupling arrangement, the articulated vehicles in a train positively follow around corners along a desired course, thus satisfying an important object of the invention.

These and other objects of the invention will become more apparent from the specification and drawings, wherein:

FIGURE 1 is a perspective illustration depicting the manner in which a vehicle train composed of vehicles constructed in accordance with the invention principles rounds a corner;

FIGURE 2 is a plan view, with the upper body portions removed, of a single articulated modular vehicle constructed in accordance with the invention:

FIGURES 3 and 4 are partial top and side views, respectively, particularly illustrating the novel hitch arrangement as utilized to intercouple the rear unit of a leading vehicle with the front unit of a trailing vehicle;

FIGURES 5 and 6 are perspective illustrations useful in explaining the manner in which the novel hitch arrangement is utilized in various service operations of the vehicles; and FIGURE 7 is a perspective view particularly illustrating yet another feature relating to the hitch of this invention.

FIGURE 1 depicts a plurality of vehicles 20, 21, 22, and 23 constructed and intercoupled in accordance with the inventive principles to provide a vehicle train. The head end or lead vehicle 20 comprises a front unit 24 and a rear unit 25, with the designations "front" and "rear" referencing the unit components of the vehicle with respect to the normal direction of travel. A pair of front wheels 26 and 27 support front unit 24 as illustrated, and a pair of rear wheels 28 and 30 support rear unit 25. A cab 31 is affixed to front unit 24 of vehicle 20.

The illustration of FIGURE 1 indicates that rear unit 34 of the second vehicle 21 is positioned at an angle with respect to front unit 33 of the same vehicle, as the vehicle train moves around an obstacle or rounds a corner at an intersection. The third vehicle 22 in the train comprises a front unit 35 and a rear unit 36. As this vehicle rounds the corner, it is noted that there is an angular displacement or relationship between front unit 35 and rear unit 36. In accordance with an important aspect of the inventive teaching, rear unit 34 of vehicle 21 is intercoupled with front unit 35 of vehicle 22 so that these two units cooperate to form a bogie or an independent supporting unit. The specific components of the intercoupling between rear unit 34 and front unit 35 of the two different vehicles will be described and illustrated hereinafter. For the present purposes, it is sufficient to emphasize that the articulation or angular movement of the various vehicles of the train is effected between the individual units of each vehicle, such as units 33 and 34 of vehicle 21, as the train rounds the corner, but the intercoupling between vehicles is such as to cause the front unit of each vehicle to follow in line with the trailing unit of the preceding vehicle, thereby affording a bogie-type component. Such operation affords positive control and excellent following characteristics of each vehicle in the train as direction changes are effected from the lead vehicle.

In FIGURE 1, a container 37 is also illustrated, and this container is receivable within the well of the rear unit 36 of vehicle 22 in an obvious manner. Container 37 can be of the well-known Conex type and it is noted that the construction of the invention permits a Conex-type load to be carried with a relatively low center of gravity of the overall vehicle, rather than requiring mounting of the Conex container entirely above the uppermost portion of the vehicle tires.

In FIGURE 2, the lead vehicle 20 is illustrated, with the cab and structural plate components removed, to illustrate the articulation of the vehicle and the mounting of major components thereon. In the front portion, a conventional internal-combustion engine 40 is positioned, and a pair of variable displacement pumps 41 and 42 are affixed thereto so that operation of the motor 40 is effective to displace the actuator units within the pumps 41 and 42. Each of pumps 41 and 42 includes a projecting stem or control element, referenced by numerals 43 and 44 respectively. An oil reservoir 45 (FIGURE 2) is provided to supply oil, the operating fluid of the illustrated embodiment, over lines 46 and 47 to pumps 41 and 42, respectively. From pump 41 another oil line 48 provides intercoupling with a bank of control valves 50, and another line 51 intercouples pump 42 with other control valves in the same bank.

A pair of beam members 52 and 53 are provided as indicated, each extending from a point adjacent a front wheel in front unit 24 in the form of a V and joined at the apex of the V by a coupling unit 54, thereby forming in effect a single extension member which is pivotally coupled by a pin 55 to a main beam 56 in rear unit 25 of vehicle 20. Beam 56 is pivoted about a vertical pin 57, with the rear portion of beam 56 extending downwardly (not visible in FIGURE 2) and received in an arcuate channel member 58 for guiding this portion of the main beam as it is pivoted around shaft 57. The respective ends of channel 58 are affixed to a pair of support beams 60 and 61 joined together in a V-shaped support unit with the apex thereof adjacent shaft 57 and the extremities of the V-unit supporting the motor-and-rear-wheel assemblies.

A plurality of cantilever beams, or supports 62–65 extend outwardly from a location just to the rear of shaft 57, to afford support for the container or load deposited within the well of rear unit 25. A pair of fuel tanks 66 and 67 are indicated at the rear of unit 25 over the axle, and another cantilever support beam 68 extends from the axle area rearwardly to a location adjacent the rear extremity of unit 25.

Rear tire 28 is broken away, indicating generally the manner in which one of the hydrostatic drive motors 70 is supported adjacent the extremity of the axle to drive the wheel. Responsive to receipt of fluid transmitted from front unit 24 through one of lines 71 to hydrostatic motor 70, angular rotation of rear wheel 28 is effected.

A first cylinder assembly 72 and a second cylinder assembly 73 are utilized to provide the articulation or relative angular displacement between front unit 24 and rear unit 25 of the vehicle 20. Cylinder 72 includes a barrel portion 74 and a cylinder rod 75 with one end of rod 75 affixed by a pivotal coupling unit 76 to a side of beam 52 as indicated. Likewise, the end of barrel 74 remote from the cylinder rod is pivotally coupled by a unit 77 to one side of main beam 56 in rear unit 25. Cylinder assembly 72 is a double-acting unit, and a pair of fluid lines 78 and 80 affords ingress and egress of the oil to either side of the cylinder head. Likewise cylinder assembly 73 is also a double-acting unit, with one end of barrel 82 pivotally coupled by assembly 84 to one side of beam 61, and an end portion of cylinder rod 83 pivotally coupled by an assembly 85 to one side of main beam 56 in the rear unit of vehicle 20.

The two cylinder assemblies 72 and 73 are connected to be regulated by a single control, but physically their actions are opposite. That is, if a "turn right" signal is being executed by the mechanism of vehicle 20, the oil flow into and out of cylinder assembly 72 is such as to cause cylinder rod 75 to become extended or moved outwardly with respect to barrel 74, causing a clockwise movement of the V-shaped extension member including beams 52 and 53 with respect to main beam 56 in rear unit 25. At the same time, in the other cylinder assembly 73 cylinder rod 83 is moving inwardly within barrel 82, simultaneously effecting a clockwise angular displacement of beam 56 about an axis coincident with the center of shaft 57. Accordingly the net effect of the two separate rotational movements is cumulative, providing for a substantial effective angular displacement between front unit 24 and rear unit 25.

The means for intercoupling any two vehicles with a four-point hitch arrangement is illustrated in FIGURES 3 and 4. As there shown, the rear unit 25 of the lead vehicle and its rear drive wheels 28 and 30 are spaced from front unit 33 of the next trailing vehicle, which includes a pair of front wheels 90 and 91. On each vehicle, the four individual coupling components or link assemblies are affixed to the forward unit of the vehicle for receipt in suitable mating attachments on the rear unit of the preceding vehicle.

More specifically, and as best seen in FIGURE 4, a first coupling component affixed to the front unit 33 of vehicle 21 comprises a double-acting cylinder assembly 92, from which the hoses and other parts are omitted for the sake of clarity of the coupling illustration. Assembly 92 comprises a barrel portion 93 and a cylinder rod 94. Barrel 93 is pivotally connected by a pin member 95 to the side of unit 33, and an end of cylinder rod 94 is pivotally connected by a pin 96 to an intermediate portion of a link 97, one end of which is pivotally connected by pin 98 to unit 33. A removable pin 100 provides for selective intercoupling of the other end of link 97 with a bracket extension portion 101 at the lower rear of unit 25.

As seen in FIGURE 3, another cylinder assembly 102 including a barrel 103 and a cylinder rod 104 is provided at the other side of front unit 33, with barrel 103 pivotally coupled to unit 33 by a pin member 105. Cylinder rod 104 is intercoupled with a central part of another link 106 which is selectively coupled by a removable pin (not visible) to a bracket extension 107 at the lower rear portion of unit 25. Transverse bracing between links 97 and 106 is afforded by a diagonal member 108, coupled by rubber bushings 110 and 111 to the respective link members. It is noted that the two links 97 and 106 provide sufficient strength to effectively intercouple two vehicles as indicated in FIGURES 3 and 4, without the utilization of the other coupling components to be described hereinafter. Link members 97 and 106 can be angularly displaced in the counterclockwise direction from the position indicated in FIGURE 4 to rest substantially flush with the front part of unit 33, by actuation of the double-acting cylinder assemblies 92 and 102. After the links are extended and intercoupled as indicated in the drawings, the cylinder assemblies can be effectively left in a neutral position to afford movement of the cylinder rods with respect to the barrel as the vehicles traverse uneven terrain.

Considering now the two upper or auxiliary link assemblies, a first link assembly 112 comprises a pair of brackets 113 and 114 which, together with the adjacent surface of unit 33, form a clevis-type receptacle for tongue 115, secured by a rubber bushing 116 between brackets 113 and 114.

Tongue 115 is rigidly affixed to sleeve 117 of assembly 112. Another tongue 118 is permanently and pivotally coupled to unit 25 by a rubber bushing 120 extending between a pair of supporting brackets 121 and 122. The other end of tongue 118 is secured by a pin member 123 which passes through either an elongated slot 124 or a circular aperture 125 in sleeve member 117, and then through a corresponding aperture (not shown) in tongue 118 of the same size as aperture 125. With pin 123 in the elongated slot 124 as shown in FIGURE 4, relative displacement between sleeve 117 and tongue 118 is possible, thus to accommodate a similar relative displacement between the two vehicles intercoupled by the four-point hitch. However, when pin 123 is inserted through aperture 125, link assembly 112 is locked in position and there is no play or movement in the link assembly. When the upper or auxiliary links are not used, pin 123 is readily removed and the assembly including tongue 115 and sleeve 117 can rest against the front of unit 33, whereas tongue 118 descends under the force of gravity and abuts the rear portion of unit 25. The construction of the other upper link assembly comprising tongue 126, sleeve 127, and tongue 128 as illustrated generally in FIGURE 3 will be obvious from the previous description.

A salient advantage of the inventive structure which is realized by the novel intercoupling between vehicles is illustrated in FIGURES 5 and 6. By actuation of the double-acting cylinder assemblies 92 and 102, the rear wheels of the forward vehicle (or the rear drive wheels of rear unit 25 of such vehicle) can be raised off the ground as illustrated in FIGURE 5. Conversely, if it is desired to raise the front end of the trailing vehicle, or front unit 33, the rams of the two cylinder assemblies 92 and 102 can be extended to jack the wheels off the ground as indicated in FIGURE 6. This is a highly desirable and most important feature which is realized with the four-point hitch arrangement of the invention.

The cylinder rods of assemblies 92 and 102 can be either withdrawn into the barrels, as indicated in FIGURE 5, to effect a lifting of one end of the lead vehicle, or substantially extended as shown in FIGURE 6 to provide the opposite effect. Still another important feature is obtainable by locking the respective cylinder assemblies 92 and 102 in their central positions, as indicated in FIGURE 7. As there shown, the shown, the lower or primary link assemblies 97 and 106 have been locked in position by locking the oil flow to the cylinder assemblies 92 and 102. In addition, the upper or auxiliary link assemblies have been locked in position in a manner described previously. Accordingly, with all of the link assemblies locked, the entire train is rigidly supported so that craters or holes can readily be traversed. Thus another important advantage, that of traversing extremely rugged and even bombed or blasted terrain is made possible by utilizing the four-point hitch provided between vehicles and locking the several link assemblies as described previously.

FIGURE 7 also illustrates another optional feature which can be mounted on any of the units. As there shown, a mast 140 supports a rotatable shaft 141, to which an I-beam section or lateral support arm 142 is affixed. A hook-and-pulley assembly 143 is affixed to the lateral support arm by a movable trolley (not visible) for sliding movement thereon.

While only a particular embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. In a vehicle train having a leading vehicle including a front unit and a rear unit articulated for angular displacement with respect to each other, and a trailing vehicle having units likewise articulated for angular displacement with respect to each other, the improvement which comprises:

connector means affixed to the rear unit of said leading vehicle;

and coupling means, extending from the front of said trailing vehicle for coupling to said connector means, for maintaining said rear unit of the leading vehicle in alignment with said front unit of the trailing vehicle along the course of the vehicle train, whereby the articulated movement of the individual vehicle units affords a turning motion around a corner while the rear unit of each vehicle effectively forms a bogie arrangement with the front unit of the trailing vehicle coupled thereto.

2. In a vehicle train:

a first vehicle, having a front unit, a rear unit with connector means at the rear thereof, and articulated means intercoupling said front unit with said rear unit;

a second vehicle, having a front unit with coupling means affixed to the front thereof, a rear unit, and articulated means joining said front unit of said second vehicle with said rear unit of said second vehicle;

and means for fastening the coupling means of said second vehicle to the connector means at the rear of said first vehicle, thereby to provide an effective bogie including both the rear unit of said first vehicle and front unit on said second vehicle, said bogie acting as an independent assembly maintained constantly in alignment notwithstanding the angular displacement of the respective units of each of said first and second vehicles.

3. A four-point hitch for intercoupling the rear portion of a leading vehicle with the front portion of a trailing vehicle, comprising:

a pair of lower link assemblies, each pivotally coupled at one end to one of said vehicles and pivotally coupled at the other end to the other of said vehicles, and each having an intermediate portion;

actuator means, having one portion coupled to one of said vehicles and another portion coupled to said intermediate portions of the lower link assemblies;

means for effectively locking said actuator means in a reference position, thereby to correspondingly maintain each of said lower link assemblies in a reference position substantially parallel to the ground plane;

a pair of upper link asemblies each coupled between said vehicles, each upper link assembly comprising a sleeve member for allowing relative displacement between the extremities of each upper link assembly;

and means in each sleeve member for selectively locking the extremities of the upper link assemblies, thereby to maintain a constant distance between the extremities of the upper link assembly.

4. A four-point hitch for intercoupling the rear unit of a lead vehicle with the front unit of a trailing vehicle to effectively form a bogie comprising said rear unit and front unit, including:

a first lower link assembly, having an end portion pivotally coupled to said lead vehicle, an intermediate portion, and another end portion pivotally coupled to said trailing vehicle at one side thereof;

a first cylinder assembly, having one end thereof affixed to said trailing vehicle and the other end thereof coupled to the intermediate portion of said first lower link assembly;

a second lower link assembly and a second cylinder assembly, disposed and connected in like manner at the opposite side of said vehicles;

a diagonal brace member;

means including a first rubber bushing for intercoupling one end of said diagonal brace member with one of said lower link assemblies, and means including a second rubber bushing for intercoupling the other end of said diagonal brace member with the other of said lower link assemblies;

a first upper link assembly comprising a pair of end members intercoupled by a sleeve unit;
means, including rubber bushings, for intercoupling said first upper link member between said vehicles at one side thereof;
a second upper link assembly, similar to said first assembly, and intercoupled in like manner between said vehicles at the other side thereof;
and selective locking means in each of said upper link assemblies for alternatively affording and preventing relative displacement between the end members of each upper link assembly.

References Cited by the Examiner

UNITED STATES PATENTS

| | | | |
|---|---|---|---|
| 2,360,902 | 10/1944 | Simmons | 280—406 |
| 2,482,976 | 9/1949 | Harwood. | |
| 2,543,054 | 2/1951 | Peter | 280—408 |
| 2,747,890 | 5/1956 | Gerhardt et al. | 280—406 |
| 2,916,301 | 12/1959 | Cushman | 280—491 |
| 3,246,714 | 4/1966 | Middlesworth | 180—14 |

LEO FRIAGLIA, *Primary Examiner.*